United States Patent
Eda et al.

(10) Patent No.: US 10,832,728 B2
(45) Date of Patent: Nov. 10, 2020

(54) LOCATION SELECTION BASED ON ADJACENT LOCATION ERRORS

(71) Applicant: International Business Machines Corporation, Armonk, NY (US)

(72) Inventors: Sasikanth Eda, Vijayawada (IN); Deepak Ghuge, Sangamner (IN); Poornima Gupte, Pune (IN); Sukumar Vankadhara, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/945,934

(22) Filed: Apr. 5, 2018

(65) Prior Publication Data

US 2019/0311742 A1    Oct. 10, 2019

(51) Int. Cl.
  *G06F 12/00*  (2006.01)
  *G11B 20/18*  (2006.01)
  *G06F 3/06*  (2006.01)
  *G06F 11/07*  (2006.01)

(52) U.S. Cl.
  CPC ........ *G11B 20/1889* (2013.01); *G06F 3/0619* (2013.01); *G06F 3/0644* (2013.01); *G06F 3/0659* (2013.01); *G06F 3/0674* (2013.01); *G06F 11/076* (2013.01); *G06F 11/0727* (2013.01); *G06F 11/0787* (2013.01)

(58) Field of Classification Search
  CPC . G11B 20/1889; G06F 3/0619; G06F 3/0644; G06F 3/0674; G06F 3/0659; G06F 11/0787; G06F 11/0727; G06F 11/076
  See application file for complete search history.

(56) References Cited

U.S. PATENT DOCUMENTS

| | | | |
|---|---|---|---|
| 6,851,018 B2* | 2/2005 | Wyatt | G11C 7/1045 711/111 |
| 9,099,155 B1 | 8/2015 | Kataria et al. | |
| 9,336,818 B1* | 5/2016 | Dunn | G11B 27/36 |
| 9,502,061 B1 | 11/2016 | Zhu et al. | |
| 9,652,160 B1 | 5/2017 | Piszczek et al. | |

(Continued)

OTHER PUBLICATIONS

Western Digital, Perpendicular Magnetic Recording (PMR), http://www.wdc.com/wdproducts/library/other/2579-701185.pdf, Jul. 2006, p. 1.

(Continued)

*Primary Examiner* — Kalpit Parikh
(74) *Attorney, Agent, or Firm* — Kunzler Bean & Adamson

(57) ABSTRACT

Systems for location selection based on adjacent location errors are provided. One system includes a monitor module that monitors write numbers for one or more locations on a storage device, wherein a write number in the write numbers describes a number of times a storage device operation has been performed at a location in the one or more locations. Additionally, the system includes an identification module that identifies locations in one or more locations that are susceptible to adjacent location errors, wherein an adjacent location error is an error caused by a storage device operation associated with an adjacent location. Also, the system includes a selection module that selects a location in one or more locations for storing data based on monitored write numbers and identified locations.

20 Claims, 8 Drawing Sheets

(56) References Cited

U.S. PATENT DOCUMENTS

2012/0079318 A1* 3/2012 Colgrove .............. G06F 3/0689
714/6.22
2013/0235486 A1* 9/2013 Hirose .................... G11B 5/09
360/55

OTHER PUBLICATIONS

Lucas Mearian, "WD leapfrogs Seagate with world's highest capacity 10TB helium drive, new flash drives", Computer World, Sep. 9, 2014, pp. 1-5.

* cited by examiner

LOCATION SELECTION BASED ON ADJACENT LOCATION ERRORS

FIELD

This invention relates to storing data and more particularly relates to methods and systems for location selection for storing data based on adjacent location errors.

BACKGROUND

Hard drives are susceptible to different errors over their operational lifetime. For example, a hard drive may be susceptible to adjacent track interference (ATI) errors. An adjacent track interference error may occur when data has been written on a track of a hard drive a number of times and data has been written to an adjacent track a relatively lesser number of times. When a large disparity exists between the number of times adjacent tracks have been written to, the relatively large number of overwrites on a particular track may cause magnetic flux interference on an adjacent track. Over time, the effects of the magnetic flux interference may accumulate such that data stored on an adjacent track may become unreadable.

Similarly, a hard drive may be susceptible to adjacent track erasure (ATE) errors. An adjacent track erasure error may occur when fringe fields, produced by longitudinal recording, write or erase data on adjacent parallel tracks on a disk on a hard drive. For example, a write coil may be overdriven with current to quickly change data stored at a location on a disk. The over driving of the write coil may also overdrive the fringe field, which may cause an ATE.

SUMMARY

Methods and systems for location selection based on adjacent location errors are provided. A system includes a monitor module that monitors write numbers for one or more locations on a storage device, wherein a write number in the write numbers describe the number of times a storage device operation has been performed at a location in the one or more locations. The system also includes an identification module that identifies locations in one or more locations that are susceptible to adjacent location errors, wherein an adjacent location error is an error caused by a storage device operation associated with an adjacent location. The system further includes a selection module that selects a location in one or more locations for storing data based on monitored write numbers and identified locations.

One method includes monitoring a write number for a location in one or more locations in a storage device the write number describing a number of times a storage device operation has been performed at the location. The method also includes identifying an adjacent location error susceptibility for a location where an adjacent location error susceptibility describes the susceptibility of the location to errors caused by storage device operations performed on adjacent locations. Further, the method includes determining whether to write data to locations based on the adjacent location error susceptibility.

Also, disclosed are computer program products comprising a computer-readable storage medium including program instructions embodied therewith for selecting a location based on adjacent location errors. Some program instructions executable by a processor can cause the processor to monitor a write number for a location in one or more locations in a storage device, the write number describing a number of times a storage device operation has been performed at the location. Further, the program instructions cause the processor to identify an adjacent location error susceptibility for the location, wherein the adjacent location error susceptibility describes the susceptibility of location errors caused by storage device operations performed on adjacent locations. Also, the program instructions cause the processor to determine whether to write data to a location based on the adjacent location error susceptibility.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
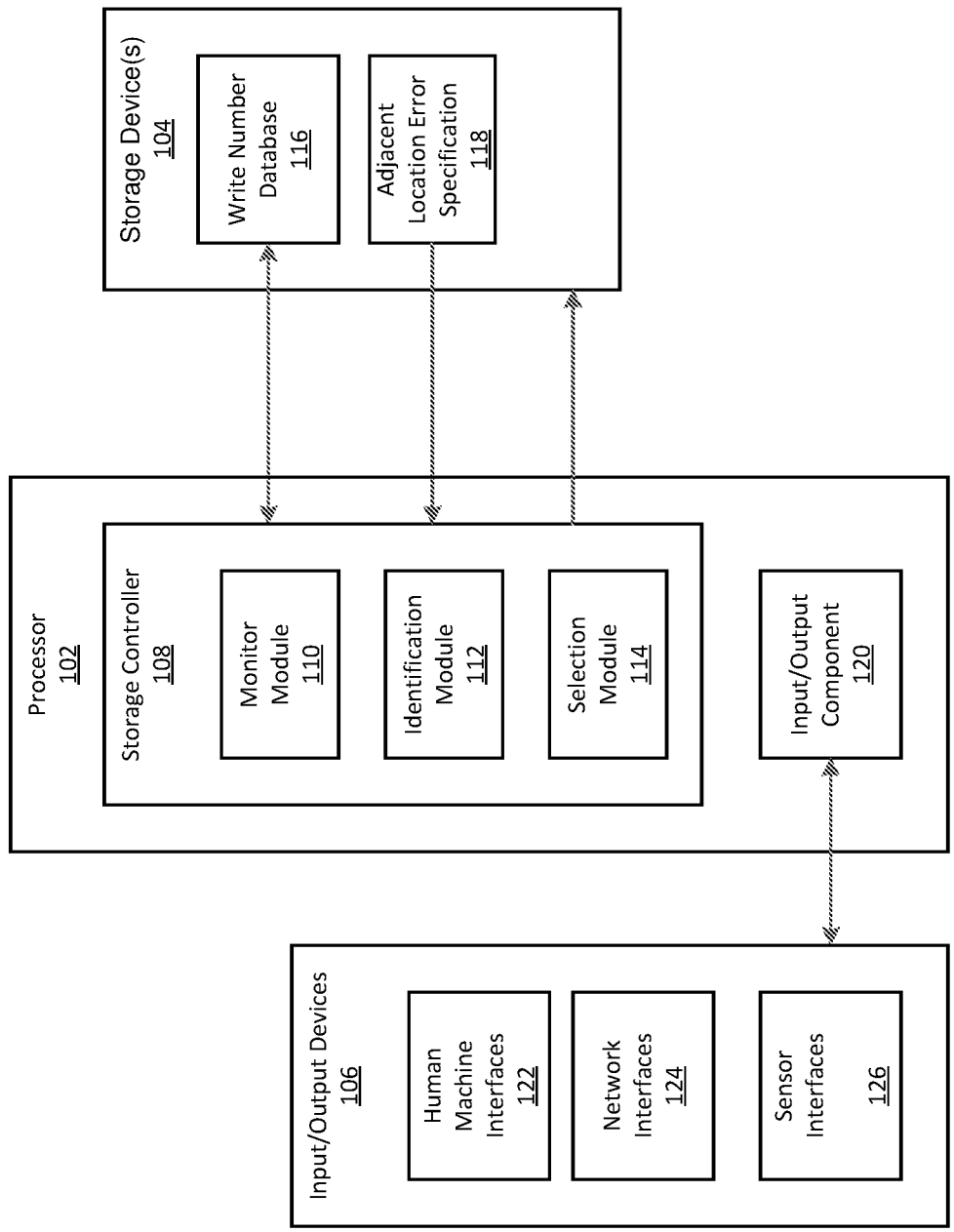
FIG. 1 is a block diagram of one embodiment of a computing system.

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A method that can select locations for storing data based on adjacent location error characterizations may include monitoring a write number for a location in one or more locations in a storage device, the write number describing a number of times data has been written to the location. The method further may include identifying an adjacent location error susceptibility for the location, wherein the adjacent location error susceptibility describes susceptibility of the location to errors caused by storage device operations performed on adjacent locations. The method also may include determining whether to write data to the location based on the adjacent location error susceptibility.

In some embodiments, a method for selecting locations may further include writing data to location when the adjacent location error susceptibility is low. In certain embodiments, writing data to the location may further include incrementing a write number for the location.

In various embodiments, the method includes designating the location as a spare based on the adjacent location error susceptibility being moderate or high. Further, identifying the adjacent location error susceptibility may include comparing the write number against a specification for the location provided by a storage device manufacturer. In certain embodiments, determining whether to write data to the location may include designating the location for reconstructing data based on the location having a low susceptibility for adjacent location errors. Also, determining whether to write data to the location may include designating the location for reconstructing data based on the location being classified as an outer track on a disk.

A system for selecting a location based on a characterization of adjacent location errors may include a monitor module that monitors write numbers for one or more locations on a storage device, wherein a write number in the write numbers describe the number of times data has been written to a location in the one or more locations. The system may further include an identification module that identifies locations in the one or more locations that are susceptible to adjacent location errors, wherein an adjacent location error is an error caused by a storage device operation associated with an adjacent location. The system may also include a selection module that selects a location in the one or more locations for storing the data based on the monitored write numbers and the identified locations.

The adjacent location errors may include adjacent track interference. Also, the adjacent location errors may include adjacent track erasures. In certain embodiments, the identification module may determine a susceptibility for adjacent location errors of locations to adjacent location errors based on the comparison of the write numbers against specifications provided by a storage device manufacturer.

In some embodiments, the selection module may select a location in the one or more locations for writing data based on the location having a low susceptibility for adjacent location errors. Also, in certain embodiments, the selection module may select a location in the one or more locations as a spare based on the location having a moderate or high susceptibility for adjacent location errors. Further, in at least one embodiment, the selection module may designate a location in the one or more locations for reconstructing data based on the location having a low susceptibility for adjacent location errors. Further, the selection module designates the location for reconstructing data based on the location being classified as an outer track on a disk.

Also disclosed are computer program products comprising a computer-readable storage medium including program instructions embodied therewith that can select a location in a storage device based on a characterization of adjacent location errors. Some program instructions are executable by a processor and cause the processor to monitor a write number for a location in one or more locations in a storage device, the write number describing a number of times data has been written to the location. The program instructions further causing a processor to identify an adjacent location error susceptibility for the location where the adjacent location error susceptibility describes susceptibility of location errors caused by storage device operations performed on adjacent locations. The program instructions also causing a processor to determine whether to write data to the location based on the adjacent location error susceptibility.

In some embodiments, the program instructions further cause the processor to write data to the location based on the adjacent location error susceptibility being low. Also, the program instructions cause the processor to increment the write number for the location. Additionally, the program instructions cause the processor to designate the location as a spare based on the adjacent location error susceptibility being moderate or high. Further, the program instructions cause the processor to compare the write number against a specification for the location provided by a storage device manufacturer.

The description of elements in each figure below may refer to elements of proceeding Figures. For instance, like numbers can refer to similar elements in all figures, including alternate embodiments of similar elements.

With reference now to the figures, FIG. 1 is a diagram illustrating one embodiment of a system 100 for storing data in a storage device. At least in the illustrated embodiment, the system 100 includes, among other components, a processor 102 coupled to several input/output devices 106 and one or more storage devices 104.

In certain embodiments, the processor 102 may be a processor of a general purpose computer, special purpose computer, or other programmable data processing apparatus. As described herein, the processor 102 may execute computer readable program instructions associated with selecting locations for storing data on a storage device 104 based on a characterization of adjacent location errors for the separate locations on the storage device 104. In at least one embodiment, the processor 102 may execute computer readable program instructions associated with a storage controller 108. The storage controller 108 may include multiple modules to control the storing of data on a storage device 104 coupled to the processor 102. For example, the storage controller 108 may include a monitor module 110, an identification module 112, and a selection module 114. Further, to acquire data from sources other than the execution of a computer readable program instructions, the processor 102 may execute computer readable program instructions associated with an input/output component 120.

A storage device 104 may be any suitable type of storage device that is known or developed in the future that can store computer-usable data. In various embodiments, a storage device 104 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with the computer processing device such as processor 102.

In certain embodiments, a storage device 104 may be implemented as a direct-access storage device (DASD). A storage device 104, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A storage device 104, in various embodiments, may include non-volatile/persistent hardware and/or software configured to perform long-term data storage operations, including, but not limited to, data archiving, data backup, data mirroring, replicating data, etc. For instance, a storage device 104 may include non-volatile and/or persistent hardware and/or software to perform long-term data storage operations, which may include write operations, read operations, read-write operations, etc., among other operations.

In certain embodiments, the storage device 104 may be a hard disk drive where data is stored by writing the data to tracks that partially overlap adjacent tracks. Where data is written to a storage device having partially overlapping tracks, the storage device 104 may be a shingled magnetic recording device. Alternatively, the storage device 104 may be a perpendicular magnetic recording device. When the storage device 104 is a perpendicular magnetic recording device, the magnetization of each data bit may be aligned vertically to a horizontally spinning disk. Further, the storage device 104 may be a longitudinal magnetic recording device. When the storage device 104 is a longitudinal magnetic recording device, the magnetization of each data bit may be aligned longitudinally to a spinning disk.

In some embodiments, a storage device 104 may store objects (e.g., data, executable programs, source program libraries, etc.). In at least one embodiment, the storage device 104 stores a write number database 116. A write number database 116, as described herein, may refer to a data structure that stores write numbers for particular locations in the storage device 104. A write number, as used herein, may refer to a measurement indicating how many times a particular location has been written to on the storage device 104. For example, a write number may be a number indicating the number of times a particular location has been written over. Alternatively, a write number may be a number or a series of numbers that indicate a difference in the number of times a track has been written to in comparison to neighboring locations.

In certain embodiments, a storage device 104 may also store information regarding adjacent location errors in an adjacent location errors specification 118. In certain implementations, an adjacent location error specification 118 may store data for the separate locations on the storage device 104 regarding adjacent location errors. In certain embodiments, the adjacent location errors may refer to adjacent track interference and adjacent track erasures. As described above, adjacent track interference occurs when a hard drive track is written to many times with a relatively lesser number of write operations performed on adjacent tracks. When this occurs the data on the adjacent tracks may become corrupted. In particular, the repeated overwrites may cause magnetic flux interference on the adjacent tracks such that over many write cycles, the magnetic flux interference may accumulate leaving the adjacent tracks unreadable. For example, a track X may have adjacent tracks X+1 and X−1. In certain embodiments, track X may be written to many times when compared with tracks X+1 or X−1. When there is a large disparity between the number of times adjacent tracks have been written to, there may be a high probability that data residing on the tracks X+1 or X−1 is corrupted. Further, as described above adjacent track erasures may occur when the storage device 104 is a longitudinal recording device. In longitudinal recording devices, fringe fields may be produced that can inadvertently write or erase data on adjacent parallel tracks on the disk.

In certain embodiments to prevent the writing or erasure of data in adjacent tracks, a fringe field may typically be less than the nucleation field. However, in some embodiments, a write coil may be overdriven with current to quickly change the magnetic data in the media. For example, a profile of the current signal to write coil may include a brief pulse of 100 mA that settles down to a signal 30 mA. Unfortunately, overdriving a write coil may end up overdriving the fringe field as well. When a fringe field is overdriven, data on an adjacent track may be erased.

In certain embodiments, the location selection for storing data on a hard drive may be randomized. As such the selection of disk locations for writing data, parity segments, and the like may trigger or increase the effects of adjacent track interference and adjacent track erasures. The adjacent location error specification 118 may store data that characterizes the effects of the adjacent track interference and adjacent track erasures for the multiple locations on the storage device 104. In at least one implementation, data stored in the adjacent location error specification 118 may be provided by a manufacturer of the storage device 104. Alternatively, data stored in the adjacent location error specification 118 may be based on observations of multiple storage devices.

In certain embodiments, a storage device 104 may be controlled by a storage controller 108. The storage controller 108 may be computer readable instructions that are executed by a processor 102. As described above the storage controller 108 may include a monitor module 110, an identification module 112, and a selection module 114. In certain embodiments, the monitor module 110 may monitor the number of times data is written to a particular location on the storage device 104. For example, the monitor module 110 may maintain a table in the write number database 116 for storing information for the separate locations on the storage device 104. When a location is written to, the monitor module 110 may increment a counter associated with that particular location in the write number database 116. In certain embodiments, monitor module 110 may store information regarding the difference between the number of times a particular location has been written to and the number of times data has been written to adjacent locations in the write number database 116.

In further embodiments, the storage controller 108 may include an identification module 112. The identification module 112 may use information stored in the write number database 116 regarding the number of times data has been written to the different locations on the storage device 104 and compare the information in the write number database 116 against data stored in the adjacent location error specification 118. Based on this comparison, the identification module 112 may identify the susceptibility of a particular location on the storage device 104 to adjacent location errors. In at least one embodiment, the identification module 112 may provide a probability that a location may experience adjacent location errors. Alternatively, the identification module 112 may provide a characterization of the susceptibility to adjacent location errors for a particular location. For example, a characterization provided by the identification module 112 may designate the susceptibility to adjacent location errors as "high," "moderate," or "low."

In certain embodiments, the identification module 112 may calculate the susceptibility for particular locations to adjacent location errors upon reception of data to be stored on the storage device. Further, the identification module 112 may store information regarding the susceptibility for a location to adjacent location errors in the write number database 116 in association with a write number for a particular location. For example, the identification module 112 may store the write number along with the characterization of "high," "moderate," or "low" associated with the different locations identified in the write number database.

In additional embodiments, the storage controller 108 may include a selection module 114. The selection module 114 may use information provided by the identification module 112 to select a location on the storage device for storing data. Alternatively, the selection module 114 may use information provided by the identification module 112 to designate a location on the storage device as a spare location. For example, a selection module 114 may determine that locations having a low susceptibility to adjacent location errors are preferable for storing data when compared to locations having a high or moderate susceptibility to adjacent location errors. Accordingly, the selection module 114 may select a location having a low susceptibility to adjacent location errors as the location to write data. Alternatively, the selection module 114 may determine that locations having a probability of experiencing an adjacent location error less than a threshold value as preferable for storing data when compared to locations having a probability of experiencing adjacent location errors that is greater than the threshold value. When the storage controller 108 has data to store on the storage device 104, the storage controller 108 may store the data at a location on the storage device 104 identified by the selection module 114 for storing data.

In a further embodiment, the storage controller 108 may designate locations on the storage device 104 as spare locations. For example, the selection module 114 may determine that locations having a moderate or high susceptibility to adjacent location errors should be designated as spare locations. Alternatively, the selection module 114 may determine that locations having a probability of experiencing an adjacent location error greater than a threshold value should be designated as spare locations. Accordingly, when the storage controller 108 has data to store on the storage device 104, the storage controller 108 may store the data on locations other than those identified as spare locations by the selection module 114.

In certain embodiments, the storage controller 108 may identify that a portion of the storage device 104 has failed and that a separate portion of the storage device 104 may be used to reconstruct the data that was stored on the failed portion of the storage device 104. The selection module 114 may use information gathered by the identification module 112 to select a location for reconstructing the data from the failed portion of the storage device 104. For example, the selection module 114 may select unallocated or free locations having a low susceptibility to adjacent location errors for reconstructing the data from the failed portion of the storage device 104. An unallocated or free location may refer to a location on the storage device 104 that does not presently store valid data. Accordingly, the selection module 114 may identify the free locations on the storage device 104 that have low adjacent location errors as locations designated for reconstructing data for the failed portion of the storage device 104.

In an alternative embodiment, the selection module 114 may use information gathered by the identification module 112 to select a location for reconstructing the data from the failed portion of the storage device 104 based on the location being an outer location that has a low susceptibility to adjacent location errors. For example, the storage device 104 may be a hard disk drive. In embodiments where the storage device 104 is a hard disk drive, the hard disk drive may include multiple discs. The outer locations of these discs may spin faster than inner locations and accordingly may have faster data transfer speeds. As such, due to the faster data transfer speeds, the outer locations of the storage device 104 may provide some benefits for reconstructing data from a failed portion of the storage device 104. Accordingly, the selection module 114 may identify outer locations on the storage device 104 that have low adjacent location errors as locations designated for reconstructing data for the failed portion of the storage device 104.

Further, in certain embodiments, the processor 102 may receive data through an input/output component 120. The input/output component 120 may be an interface or interfaces for receiving data. For example, the input/output component 120 may receive data for processing by the processor 102 through a bus, a transceiver, or other communicative medium. In certain embodiments, the input/output component 120 may be connected to one or more input/output devices 106. The input/output devices 106 may include human machine interfaces 122. Human machine interfaces 122, as used herein, may refer to an interface that translates human interaction with the machine into machine-readable information. For example, human machine interfaces 122 may include a mouse, a keyboard, a touchscreen, a microphone, and the like. Further, the input/output devices 106 may include network interfaces 124. A network interface 124, as used herein, may refer to an interface for communicating with another device. For example, the network interface 124 may include a local network connection, an Internet connection, and the like. Also, the input/output devices 106 may include sensor interfaces 126. Sensor interfaces 126, as used herein may refer to an interface where a sensor produces machine readable information gathered from sensing an environment local to a sensing device. Sensor interfaces 126 may include a thermometer, a pressure sensor, a lidar, camera, and the like.

In at least one embodiment, the input/output component 120 provides data to the processor 102 that may potentially be stored on the storage device 104. Also, the processor 102 may generate data to be stored on the storage device 104 by processing data received from the input/output component 120 and/or processing data received from the storage device 104. In at least one embodiment, when the processor 102 generates data to be stored on the storage device 104, the storage controller 108 may use the monitor module 110, the identification module 112, and the selection module 114 to identify a location on the storage device 104 that has a low susceptibility to adjacent location errors for storing the data generated by the processor 102. Accordingly, by being aware of the susceptibility of different locations to adjacent location errors, the storage controller 108 may prolong the operative life of the storage device 104 by reducing the occurrence of adjacent location errors such as adjacent track interference and adjacent track erasures.

Figure 2:
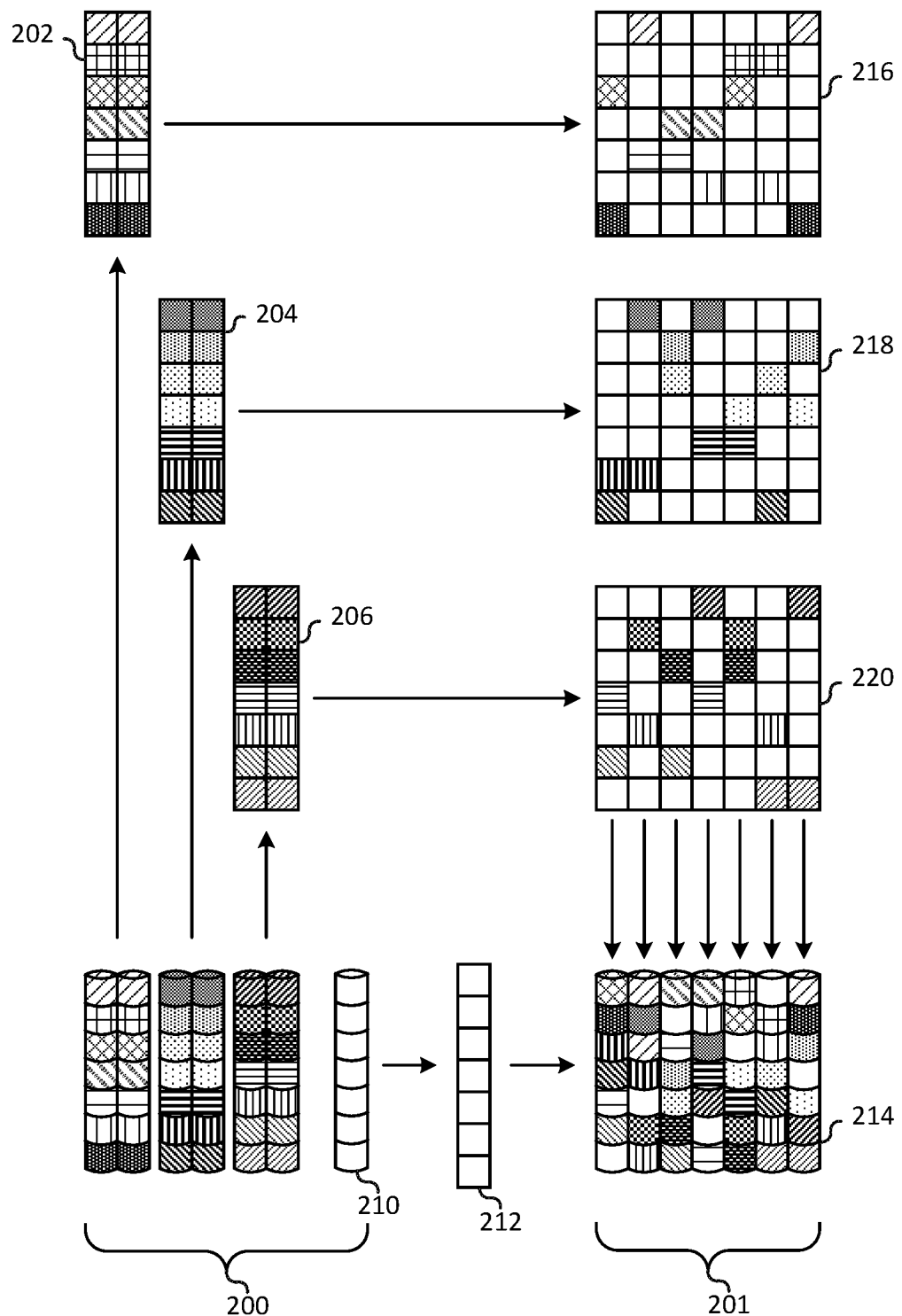
FIG. 2 is a diagram illustrating one embodiment of a declustered RAID storage device.

FIG. 2 is a block diagram illustrating a comparison of a conventional RAID storage device 200 to a declustered RAID storage device 201. As described above the storage device 104 may be implemented as a conventional RAID storage device 200. Alternatively, the storage device 104 may be a declustered RAID storage device 201. As shown, the RAID storage device 200 may include three different storage arrays. The RAID storage device 200 may include a first storage array 202, a second storage array 204, and a third storage array 206. In certain embodiments, an array may have two tracks per array spread across seven discs. In certain embodiments, a first track may be a data track and a second track may be a replica track of the first track. As illustrated, the first storage array 202, the second storage array 204, and the third storage array 206 individually have a first track and a replica track, where the replica track and the first track store the same data. In at least one embodiment, the RAID storage device 200 may include an additional spare disk 210.

In contrast to the conventional RAID storage device 200, the declustered RAID storage device 201 may spread the data across the multiple discs in the storage device 104. For example, to decluster the data in a conventional RAID storage device 200, the RAID storage device 200 may be divided into the first storage array 202, the second storage array 204, and the third storage array 206. The first storage array 202, second storage array 204, and a third storage array 206 may be divided into seven tracks, where there are two strips per array. The different strips from the different arrays may then be combinatorially spread across the different disk positions. For example, the strips of the first storage array 202 may be combinatorially spread across the seven disk positions as illustrated in first virtual disk 216. The strips of the second storage array 204 may be combinatorially spread across the seven disk positions as illustrated in second virtual disk 218. The strips of the third storage array 206 may be combinatorially spread across the seven disk positions as illustrated in third virtual disk 220. In certain embodiments, the first virtual disk 216, the second virtual disk 218, and the third virtual disk 220 may be combined as illustrated in declustered RAID storage array 214. As illustrated, the different strips from the separate virtual disks may be vertically stacked upon one another within the declustered RAID storage array 214. Further, an additional array of spare strips may be inserted in the declustered RAID storage array 214, where a single spare strip is inserted per disc.

In certain embodiments, the storage controller 108 of FIG. 1 may store data in the declustered RAID storage device 201 in a location selected by the selection module 114 to avoid adjacent location errors. For example, when spreading the strips of the different storage arrays across a disk, the selection module 114 may select locations in the disk having a low susceptibility to adjacent location errors. Further, when selecting the locations for a spare strip in the disk, the selection module 114 may select locations in the disk having a moderate or high susceptibility to adjacent location errors. In the event that a disk fails or another portion of a storage device fails, the selection module 114 may select a free location having a low susceptibility to adjacent location errors or may select an outer location having a low susceptibility to adjacent location errors.

Figure 3A:
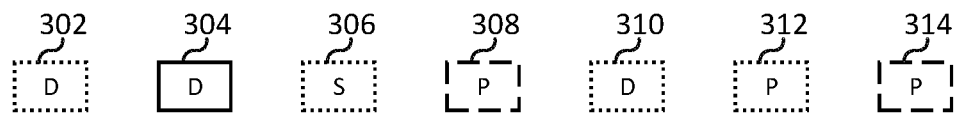
FIGS. 3A-3C is a diagram illustrating embodiments of storage locations on a storage device.
Figure 3B:
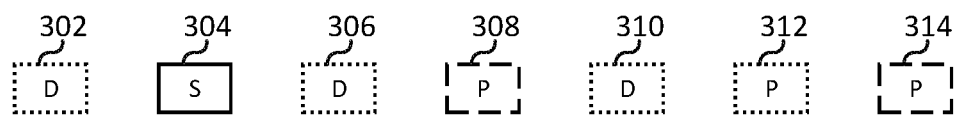
Figure 3C:
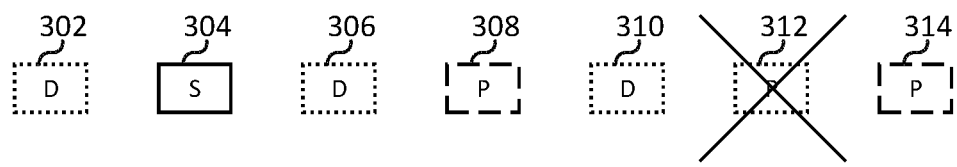

FIGS. 3A through 3B illustrate the selection of different locations on a storage disk. FIG. 3A illustrates an embodiment where location selection is random. FIG. 3B illustrates an embodiment where locations associated with high susceptibility to adjacent location errors are selected as spare locations. FIG. 3C illustrates an embodiment where locations having low susceptibility to adjacent location errors are selected for rebuilding data.

For example, as illustrated in FIG. 3A, a selection module 114 may randomly assign locations on a storage device 104 for storing particular types of data. For example, a selection module 114 may store data at a particular location, store parity information at a particular location, or may reserve a location as a spare. As illustrated, a disk may have seven separate locations on separate disks. For example, the selection module 114 may assign a first location 302, a second location 304, a third location 306, a fourth location 300, a fifth location 310, a sixth location 312, and a seventh location 314. As shown, the seven separate locations may have different susceptibilities to adjacent location errors as illustrated by the borders of the illustrated locations. For example, a location having a high susceptibility to adjacent location errors may have a solid line for a border, a location having a moderate susceptibility to adjacent location errors may have a border having long dashes, and a location having a low susceptibility to adjacent location errors may have a border having short dashes. As shown, the first location 302, the third location 306, the fourth location 310, and the fifth location 312 may have a low susceptibility to adjacent location errors. Further, the fourth location 308 and the seventh location 314 may have a moderate susceptibility to adjacent location errors. Also, the second location 304 may have a high susceptibility to adjacent location errors. As the selection module 114 randomly selects locations for storing data or reserving locations for spares, data may be saved in locations having moderate to high susceptibilities to adjacent location errors. For example, a selection module 114 may select the second location 304 for storing data. By storing data in the second location 304 which has a high susceptibility to adjacent location errors, the random selection of locations for storing data may increase the likelihood of subsequent adjacent location errors.

In contrast, FIG. 3B illustrates an embodiment where a selection module 114 selects a location for storing data based on the susceptibility of the location to adjacent location errors. For example, the selection module 114 may select locations having low susceptibilities to adjacent location errors for storing data. For example, the first location 302, the third location 306, the fifth location 310, and the sixth location 312 have low susceptibilities to adjacent location errors. Accordingly, the selection module 114 may select these locations for storing data. As shown, the selection module 114 may select the first location 302, the third location 306, and the fifth location 310, for storing data. Further, the selection module 114 may select locations for storing parity data, where locations having a lower susceptibility of adjacent location errors are preferred for storing the parity data. As shown, parity data may be stored in the sixth location 312, where the sixth location has a low susceptibility to adjacent location errors. Further, parity data may be stored in locations having a moderate susceptibility to adjacent location errors when there are no further locations having a low susceptibility to adjacent location errors. For example, parity data may be stored in the fourth location 308 and the seventh location 314, which locations have a moderate susceptibility to adjacent location errors. Further, locations having a high susceptibility to adjacent location errors may be reserved by the selection module 114 as spare locations. For example, the second location 300 for having a high susceptibility to adjacent location errors may be reserved as a spare location.

FIG. 3C illustrates an embodiment where a disk experiences a failure. For example, the disk associated with the sixth location 312 may experience a failure. When a disk experiences a failure, the data that resided on the disk may be reconstructed. The selection module 114 may select a free location having a low susceptibility to adjacent location errors for reconstructing the data. Alternatively, the selection module may select an outer location having a low susceptibility to adjacent location errors for reconstructing the data.

Figure 4:
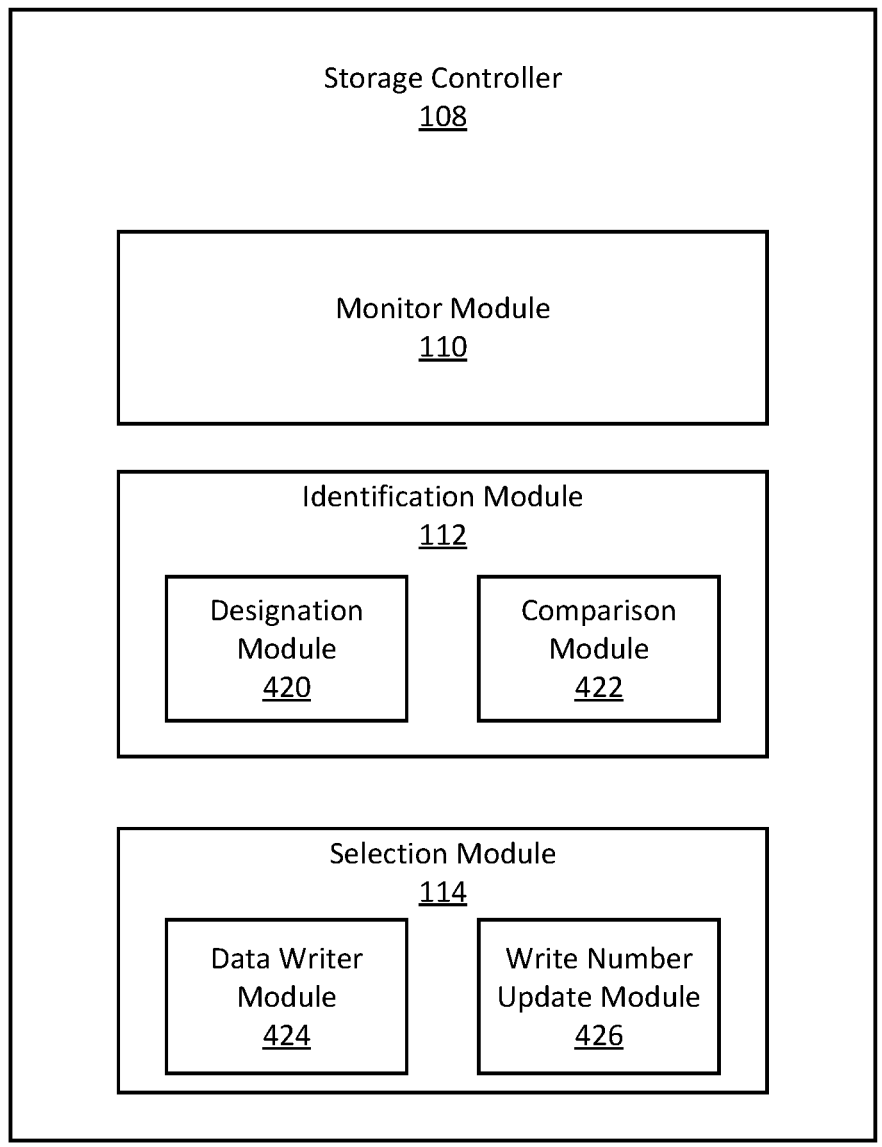
FIG. 4 is a block diagram illustrating one embodiment of a storage controller for selecting locations based on adjacent location errors.

FIG. 4 depicts another embodiment of a storage controller 108. The storage controller 108, in various embodiments may be substantially similar to the storage controller 108 described above with regards to FIGS. 1 through 3. In the depicted embodiment, the storage controller 108 includes a monitor module 110, an identification module 112, and a selection module 114, which may be configured substantially similar as described above with regards to the monitor module 110, the identification module 112, and the selection module 114 described above with respect to FIG. 1. For example, the monitor module 110 may monitor a write number for a location in one or more locations in a storage device, the write number may describe the number of times data has been written to a location in the one or more locations. Further, the identification module 112 may identify an adjacent location error susceptibility for a location, wherein the adjacent location error susceptibility described susceptibility of the location to errors caused by storage device operations performed on adjacent locations. Also, the selection module 114 may determine whether to write data to a location based on an adjacent location error susceptibility for the location. Additionally, the identification module 112 may include a designation module 420 and a comparison module 422. Further, the selection module 114 may include a data writer module 424 and a write number update module 426.

The designation module 420, in one embodiment, is configured to designate a purpose for a particular location based on the susceptibility to adjacent location errors for the location. In certain embodiments, the designation module 420 may designate a location on a storage device, such as storage device 104, for storing data, for storing parity information, or as a spare location. When designating a location as a location for storing data, the designation module 420 may determine that locations having a low susceptibility to adjacent location errors may store data. Further, the designation module 420 may determine that locations having a moderate or high susceptibility to adjacent location errors may be reserved as spare locations. In certain embodiments, the designation module 420 may designate locations as parity information locations after designating the data locations and the spare locations. As such, parity information may be stored in locations having a low, moderate, or high susceptibility to adjacent location errors.

In certain embodiments, the designation module 420 may designate locations on a storage device, such as storage device 104, for rebuilding data for a failed portion of the storage device. In at least one embodiment, the designation module 420 may designate a free location on the storage device having a low susceptibility to adjacent location errors for rebuilding data for the failed portion of the storage device. Alternatively, when the storage device is a hard disk drive, the designation module 420 may designate an outer location of the hard disk drive that has a low susceptibility to adjacent location errors for rebuilding data for the failed portion of the storage device.

The comparison module 422, in one embodiment, is configured to compare a write number for a location against a specification describing the location. For example, a storage device or another device in communication with the comparison module 422 may store a data structure describing the write numbers for different locations on the storage device. Further, the storage device or another device in communication with the comparison module 422 may store a specification characterizing the relation between adjacent location errors and locations on the storage device. For example, a specification may indicate that a particular location is susceptible to adjacent location errors when the location is written to by a number X less than adjacent locations. In at least one embodiment, the comparison module 422 uses the write numbers associated with a location and adjacent locations and compares the write numbers against information in the specification. Based on the comparison, the comparison module 422 determines whether a location has a low, moderate, or high susceptibility to adjacent location errors. Alternatively, based on the comparison, the comparison module 422 may determine a probability of adjacent location errors for a location.

The data writer module 424, in one embodiment, is configured to write data to a location based on an adjacent location error susceptibility. For example, the data writer module 424 may receive data to be stored on a storage device, such as storage device 104. Before storing the data on the storage device, the data writer module 424 may identify locations having a low susceptibility to adjacent location errors as identified by the identification module 112. When the data writer module 424 identifies a location having a low susceptibility to adjacent location errors, the data writer module 424 may write data to the identified location. In certain embodiments, where there is more than one location having a low susceptibility to adjacent location errors, the data writer module 424 may save data to the location having the lower write number. Alternatively, the data writer module 424 may save data to a location where the difference in the write numbers for the location and adjacent locations may decrease in response to writing data to the location.

In at least one embodiment, in response to a failure at a location on the storage device, the data writer module 424 may write reconstructed data to a location on the storage device. As described above, in response to failure, the data writer module 424 may write reconstructed data to a free location having a low susceptibility to adjacent location errors or an outer location having a low susceptibility to adjacent location errors.

The update module 426, in one embodiment, is configured to update write numbers for a location. For example, when data is written to a location, the update module 426 may update write numbers for the location. In at least one embodiment, upon writing data to a location, the update module increments the write number associated with the location. Further, in embodiments, where the difference between write numbers for a location and adjacent locations is tracked, the update module 426 may also update the difference between the write numbers for the location and the adjacent locations.

Figure 5:
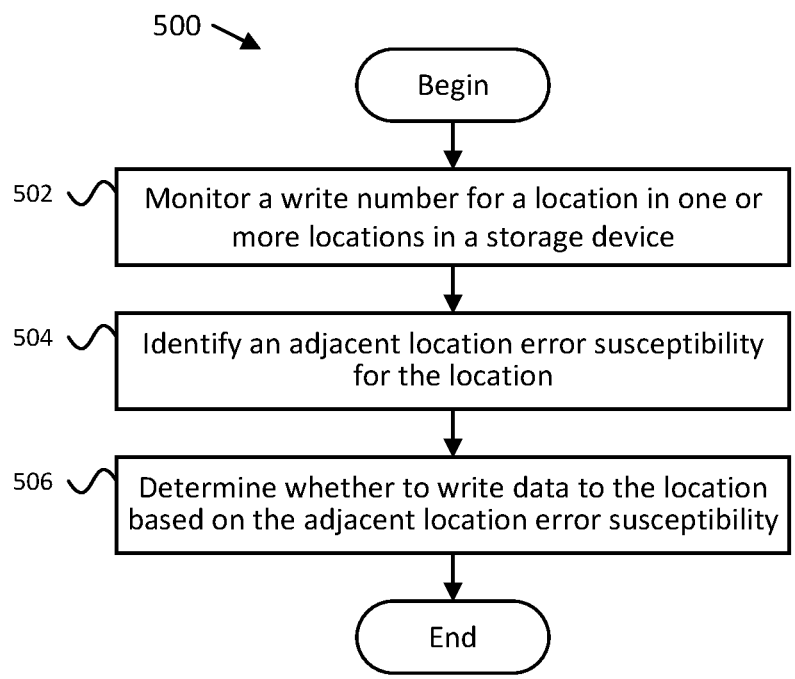
FIG. 5 is a flow chart diagram illustrating one embodiment of a method for selecting locations based on adjacent location errors.

FIG. 5 depicts one embodiment, of a method 500 for a location selection based on adjacent location errors. The method 500 begins, and the monitor module 110 monitors 502 a write number for a location in one or more locations in a storage device. As used herein, and as described above, a write number may describe a number of times storage device operations, such as a write, have performed at a particular location. Further, a location may refer to a location on a storage device. For example, the location may refer to a block of storage device, a disk, a track on a disk, and the like. Method 500 proceeds, and the identification module 112 identifies 504 an adjacent location error susceptibility for the location. As used herein, an adjacent location error susceptibility describes the susceptibility of a location on a storage device to errors caused by storage operations performed on adjacent locations.

In certain embodiments, method 500 proceeds, and the selection module 114 determines whether to write data to locations based on the adjacent location error susceptibility. As described above, the selection module 110 may designate a purpose for a particular location based on the adjacent location error susceptibility. For example, the selection module 110 may designate a location as a data location, where the location may then store data, when the location has a low susceptibility to experiencing adjacent location errors. Further, the selection module 110 may designate a location as a spare location, where the location may be available as a spare location, when the location has a moderate or high susceptibility to experiencing adjacent location errors. When the location is designated as a data location, data may be written to the location. As a system implementing method 500 may be aware of the susceptibility to adjacent location errors for different locations when determining where to write data, the implementation of the method 500 may mitigate the negative effects of adjacent location errors. Method 500 then ends.

Figure 6:
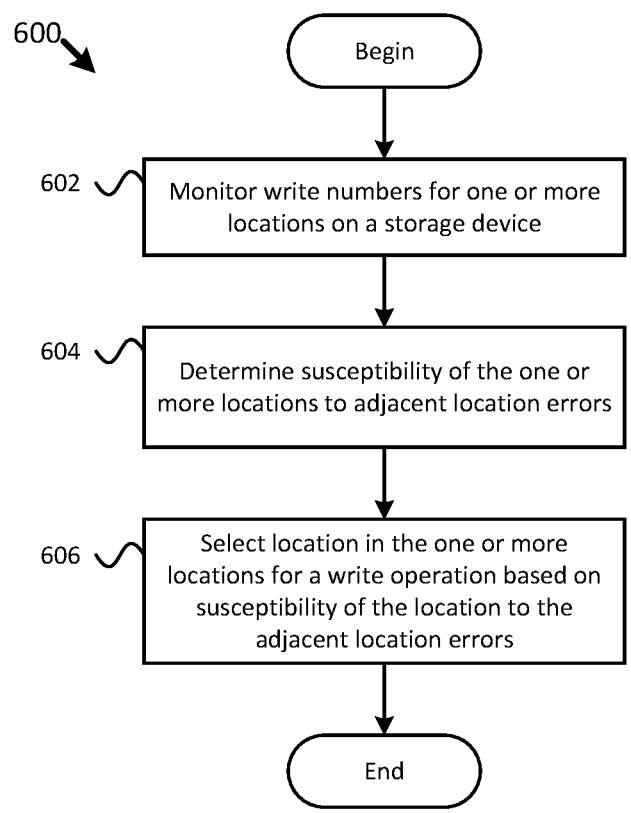
FIG. 6 is a flow chart diagram illustrating a further embodiment of a method for selecting locations based on adjacent location errors.

FIG. 6 depicts one embodiment of a method 600 for selecting a location for a write operation based on a susceptibility to adjacent location errors. In certain embodiments, method 600 begins at 602, where write numbers may be monitored for one or more locations on a storage device. Method 600 then proceeds at 604, where a susceptibility of the one or more locations to adjacent location errors may be determined. For example, a storage controller, such as storage controller 108, may determine the susceptibility for the different locations on a storage device, such as storage device 104. In at least one implementation, the storage controller may determine that a particular location has a low, moderate, or high susceptibility to adjacent location errors. In at least one embodiment, the storage controller may determine that a range of locations has a low, moderate, or high susceptibility to adjacent location errors.

In certain embodiments, method 600 proceeds at 606, where a location in the one or more locations may be selected for a write operation based on a susceptibility of the location to the adjacent location errors. For example, a storage controller may write data to locations having a low susceptibility to adjacent location errors. Further, the storage controller may reserve locations having a moderate or high susceptibility to adjacent location errors as spare locations.

Figure 7:
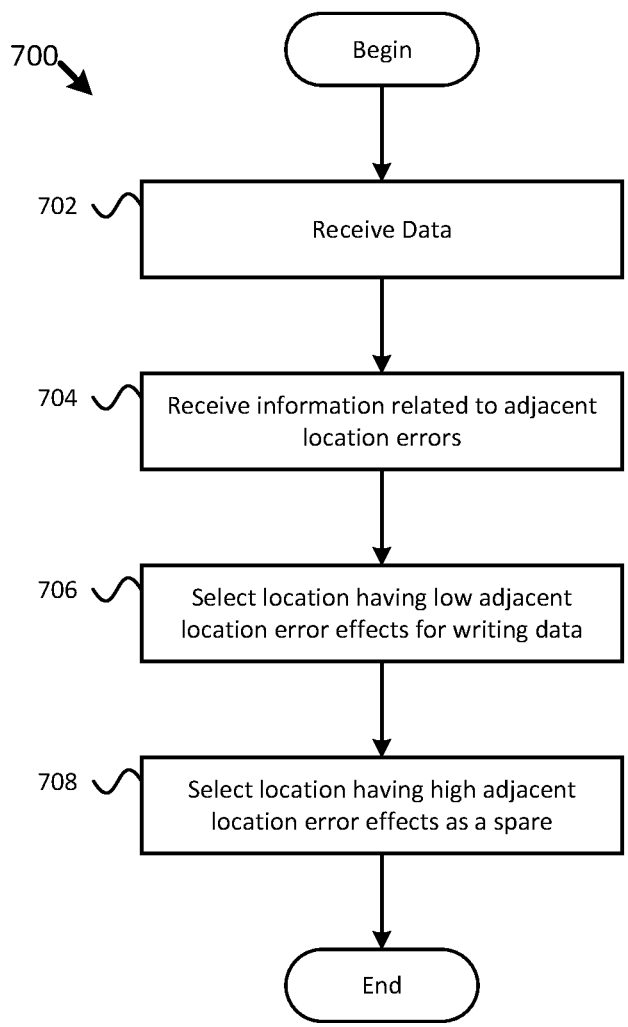
FIG. 7 is a flow chart diagram illustrating a further embodiment of a method for selecting locations based on adjacent location errors.

FIG. 7 depicts an additional embodiment of a method 700 for selecting a location for a storage device operation based on a susceptibility to adjacent location errors. For example, method 700 begins at 702, where data is received. Method 700 then proceeds to 704, where information is received related to adjacent location errors. As described above, information may be received by comparing a record of write numbers against information provided by a specification for the storage device. Method 700 then proceeds to 706, where a location having low adjacent location error effects is selected for writing data. Method 700 further proceeds at 708, where a location having high adjacent location error effects is selected as a spare.

Figure 8:
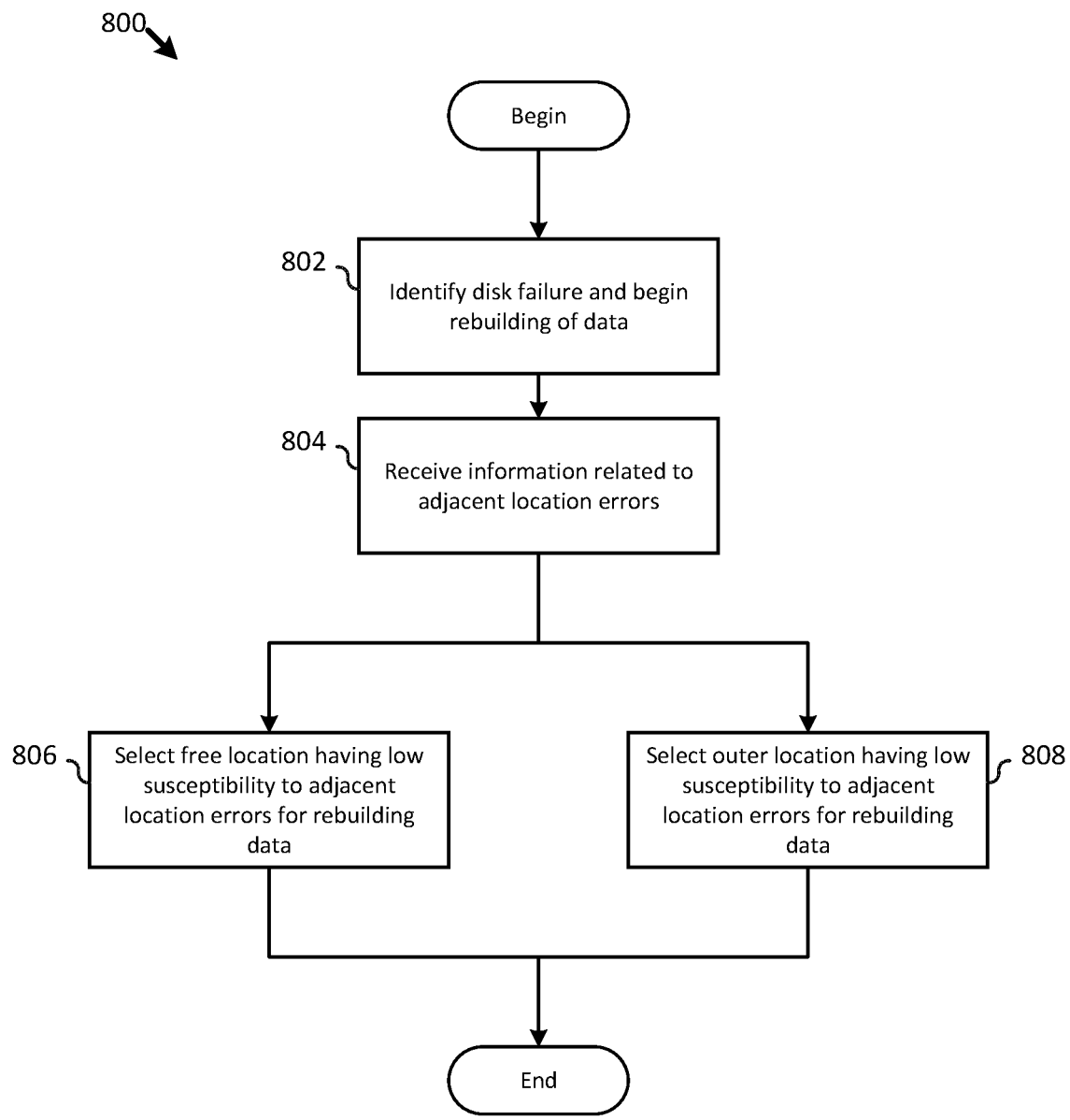
FIG. 8 is a flow chart diagram illustrating one embodiment of a method for selecting locations for reconstructing data based on adjacent location errors.

FIG. 8 depicts an embodiment of a method 800 for selecting a location on a storage device for rebuilding data. For example, method 800 begins at 802 where a disk failure is identified and the rebuilding of data begins. Further, method 800 proceeds at 804 where information is received related to adjacent location errors. As described above, information may be received by comparing a record of write numbers against information provided by a specification for the storage device. Additionally, method 800 proceeds at either 806 or 808. When method 800 proceeds at 806, a free location having a low susceptibility to adjacent location errors is selected for rebuilding data. Alternatively, when method 800 proceeds at 808, an outer location having low susceptibility to adjacent location errors is selected for rebuilding data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a monitor module that monitors write numbers for a plurality of storage locations on a storage device, wherein each write number describes a quantity of times a storage device operation has been performed at a respective associated storage location in the plurality of storage locations;
    an identification module that identifies storage locations in the plurality of storage locations that are susceptible to adjacent location errors, wherein adjacent location errors include errors caused by a storage device operation associated with an adjacent storage location; and
    a selection module that:
        selects a first storage location in the plurality of storage locations and stores data to the first storage location, and
        selects a second storage location in the plurality of storage locations and stores parity information for the data based on the monitored write numbers corresponding to the first storage location and the second storage location,
    wherein:
        the second storage location includes a higher susceptibility to an adjacent location error than the first storage location, and
        at least a portion of said modules comprise one or more of a set of hardware circuits, a set of programmable hardware devices, and executable code stored on a set of non-transitory computer-readable storage media.

2. The system of claim 1, wherein the adjacent location errors comprise adjacent track interference.

3. The system of claim 1, wherein the adjacent location errors comprise adjacent track erasures.

4. The system of claim 1, wherein the selection module selects a storage location in the plurality of storage locations for writing data based on the storage location including a relatively low susceptibility for adjacent location errors.

5. The system of claim 1, wherein the selection module selects a storage location in the plurality of storage locations as a spare storage location based on the storage location including a relatively moderate or relatively high susceptibility for adjacent location errors.

6. The system of claim 1, wherein the identification module determines a susceptibility for respective adjacent location errors of the plurality of storage locations to adjacent location errors based on a comparison of the write numbers against specifications defined by a storage device manufacturer.

7. The system of claim 1, wherein the selection module designates a storage location in the plurality of storage locations for reconstructing data based on the storage location including a relatively low susceptibility for adjacent location errors.

8. The system of claim 7, wherein the selection module designates the storage location for reconstructing data based on the storage location being classified as an outer track on a disk.

9. A method comprising:
    monitoring write numbers for a plurality of locations in a storage device, each write number describing a quantity of times a storage device operation has been performed at a respective associated storage location in the plurality of storage locations;
    identifying an adjacent location error susceptibility for each storage location, wherein the adjacent location error susceptibility describes the susceptibility of each storage location to errors caused by storage device operations performed on respective adjacent storage locations; and
    selecting a first storage location in the plurality of storage locations and storing data to the first storage location based on the monitored write numbers corresponding to the first storage location, and
    selecting a second storage location in the plurality of storage locations and storing parity information for the data based on the monitored write numbers corresponding to the second storage location,
    wherein the second storage location includes a higher susceptibility to an adjacent location error than the first storage location.

10. The method of claim 9, wherein:
    storing the data comprises writing the data to the first storage location in response to identifying that the adjacent location error susceptibility for the first storage location is relatively low; and
    storing the parity information comprises writing the parity information to the second storage location in response to identifying that the adjacent location error susceptibility for the second storage location is relatively moderate or relatively high.

11. The method of claim 10, wherein:
    writing the data to the first storage location further comprises incrementing the write number for the first storage location; and
    writing the parity information to the second storage location further comprises incrementing the write number for the second storage location.

12. The method of claim 9, further comprising designating a third storage location in the plurality of storage locations as a spare storage location based on the adjacent location error susceptibility being moderate or high for the third storage location.

13. The method of claim 9, wherein identifying the adjacent location error susceptibility further comprises comparing the write number for each respective storage location in the plurality of storage locations against a specification for the plurality of storage locations defined by a storage device manufacturer.

14. The method of claim 9, wherein selecting the first storage location further comprises designating the first storage location for reconstructing the data based on the first storage location including a relatively low susceptibility for adjacent location errors.

15. The method of claim 14, wherein selecting the first storage location further comprises designating the second storage location for reconstructing data based on the first storage location being an outer track on a disk.

16. A computer program product comprising a computer-readable storage medium including program instructions embodied therewith, the program instructions executable by a processor to cause the processor to:

> monitor write numbers for a plurality of locations in a storage device, each write number describing a quantity of times a storage device operation has been performed at a respective associated storage location in the plurality of storage locations;
>
> identify an adjacent location error susceptibility for each storage location, wherein the adjacent location error susceptibility describes a susceptibility of each storage location to errors caused by storage device operations performed on respective adjacent storage locations;
>
> select a first storage location in the plurality of storage locations and storing data to the first storage location based on the monitored write numbers corresponding to the first storage location, and
>
> select a second storage location in the plurality of storage locations and storing parity information for the data based on the monitored write numbers corresponding to the second storage location,
>
> wherein the second storage location includes a higher susceptibility to an adjacent location error than the first storage location.

17. The computer program product of claim 16, wherein:

storing the data comprises writing the data to the first storage location based on the adjacent location error susceptibility for the first storage location being relatively low; and storing the parity information comprises writing the parity information to the second storage location in response to identifying that the adjacent location error susceptibility for the second storage location is relatively moderate or relatively high.

18. The computer program product of claim 16, wherein:

writing the data to the first storage location further comprises incrementing the write number for the first storage location; and writing the parity information to the second storage location further comprises incrementing the write number for the second storage location.

19. The computer program product of claim 16, the program instructions further causing the processor to designate a third storage location in the plurality of storage locations as a spare storage location based on the adjacent location error susceptibility for the third storage location being relatively moderate or relatively high.

20. The computer program product of claim 16, the program instructions further causing the processor to compare the write number for each respective storage location in the plurality of storage locations against a specification for the plurality of storage locations defined by a storage device manufacturer.

* * * * *